US012664048B2

(12) United States Patent
Kuo

(10) Patent No.: US 12,664,048 B2
(45) Date of Patent: Jun. 23, 2026

(54) DECODING METHOD AND DECODER DEVICE USED IN FLASH MEMORY CONTROLLER CAPABLE OF REDUCING DESIGN COMPLEXITY AND CIRCUIT COSTS

(71) Applicant: Silicon Motion, Inc., Hsinchu County (TW)

(72) Inventor: Shiuan-Hao Kuo, New Taipei City (TW)

(73) Assignee: Silicon Motion, Inc., Hsinchu County (TW)

( * ) Notice: Subject to any disclaimer, the term of this patent is extended or adjusted under 35 U.S.C. 154(b) by 50 days.

(21) Appl. No.: 18/942,784

(22) Filed: Nov. 11, 2024

(65) Prior Publication Data

US 2025/0217231 A1     Jul. 3, 2025

(30) Foreign Application Priority Data

Jan. 2, 2024     (TW) ................................. 113100028

(51) Int. Cl.
*G06F 11/10*          (2006.01)
*G06F 5/00*          (2006.01)
(Continued)

(52) U.S. Cl.
CPC .......... *G06F 11/1068* (2013.01); *G06F 5/017* (2013.01); *G06F 11/1048* (2013.01)

(58) Field of Classification Search
CPC .. G06F 11/1068; G06F 5/017; G06F 11/1048; G11C 16/26; G11C 16/0483; H03M 13/1148
See application file for complete search history.

(56) References Cited

U.S. PATENT DOCUMENTS 9,459,956 B2 * 10/2016 Hubris .............. H03M 13/6561
9,544,090 B2 * 1/2017 Graef ................. H03M 13/1108
(Continued)

FOREIGN PATENT DOCUMENTS

TW          202401250 A       1/2024

*Primary Examiner* — Justin R Knapp
(74) *Attorney, Agent, or Firm* — Winston Hsu

(57)          ABSTRACT

A decoding method includes: using a syndrome calculation check circuit to calculate a syndrome value of variable node $V_i$ of a parity check matrix based on multiple input bits; rotating the syndrome value of variable node $V_i$ into the direction of variable node $V_{i+1}$ to generate an estimated syndrome value of variable node $V_{i+1}$; rotating the syndrome value of variable node $V_{i-1}$ into the direction of variable node $V_{i-\Delta}$ to generate a rotated syndrome information; performing a weighted-sum calculation based on multiple rotated syndrome information to generate a flipping function value; and comparing the flipping function value with a flipping threshold to generate a flipping result; the syndrome calculation check circuit determines whether to modify/flip a specific bit according to the flipping result.

10 Claims, 3 Drawing Sheets

(51) Int. Cl.
    *G06F 5/01*         (2006.01)
    *G06F 11/00*       (2006.01)
    *H03M 13/00*      (2006.01)

(56)               References Cited

U.S. PATENT DOCUMENTS

| | | | | |
|---|---|---|---|---|
| 9,768,807 | B2 * | 9/2017 | Zhang | G06F 11/1068 |
| 10,523,236 | B2 * | 12/2019 | Kuo | H03M 13/1128 |
| 10,530,392 | B2 * | 1/2020 | Reynwar | H03M 13/1145 |
| 11,929,764 | B2 * | 3/2024 | Teng | H03M 13/118 |
| 2016/0020783 | A1 * | 1/2016 | Yang | H03M 13/1108 |
| | | | | 714/752 |
| 2016/0170832 | A1 | 6/2016 | Armstrong | |
| 2018/0157551 | A1 | 6/2018 | Ryabinin | |
| 2019/0326930 | A1 | 10/2019 | Palangappa | |

* cited by examiner (a)   Conventional barrel shifter:

(b)   Barrel shifter of the invention :

DECODING METHOD AND DECODER DEVICE USED IN FLASH MEMORY CONTROLLER CAPABLE OF REDUCING DESIGN COMPLEXITY AND CIRCUIT COSTS

BACKGROUND OF THE INVENTION

1. Field of the Invention

The present invention relates to a decoding mechanism, and more particularly to a decoder device and a decoding method used in a flash memory controller.

2. Description of the Prior Art

Generally speaking, the conventional decoder circuit requires the use of two traditional barrel shifter circuits. The rotation calculation operation of one traditional barrel shifter circuit is to rotate from the domain of the variable node to the domain of the check node, and the rotation calculation operation of the traditional barrel shifter circuit then rotates back from the domain of the check node to the domain of the variable node. The two traditional barrel shifter circuits are located in the same circuit loop, and thus many delay stages of the circuit units are inevitable to greatly affect the calculation accuracy of the decoder circuit. In addition, the mutual rotation operation between the variable node domain and the check node domain in the prior art method also causes the circuit design complexity of the traditional barrel shifter circuit to be relatively high and difficult for implementation.

SUMMARY OF THE INVENTION

Therefore one of the objectives of the present invention is to provide a novel decoder device and decoding method in a novel flash memory controller to solve the problems encountered in the conventional technology.

According to an embodiment of the invention, a decoder device used in a flash memory controller is disclosed. The flash memory controller is used to be coupled between a host device and a flash memory. The decoder device comprises a syndrome calculation check circuit, a first barrel shifter, a second barrel shifter, a variable weighted-sum calculation circuit, and a flipping circuit. The syndrome calculation check circuit is used for calculating a syndrome value of a variable node $V_i$ of a parity check matrix according to a plurality of bits of a received input data, and the parity check matrix includes N×M sub-matrices formed by multiple variable nodes $V_1$–$V_N$ and multiple check nodes $C_1$–$C_M$, wherein a value of i is in 1–N. The first barrel shifter is coupled to the syndrome calculation check circuit and is used for rotating the syndrome value of the variable node $V_i$ into a vertical direction of a variable node $V_{i+1}$ to generate an estimated syndrome value of the variable node $V_{i+1}$. The second barrel shifter is coupled to the syndrome calculation check circuit and is used for rotating a syndrome value of a variable node $V_{i-1}$ into a vertical direction of a variable node $V_{i+\Delta}$ to generate information of a rotated syndrome value. The variable weighted-sum calculation circuit is coupled to the second barrel shifter and is used for determining a plurality p of weight values based on information of a plurality of rotated syndrome values outputted by the second barrel shifter to perform a weighted-sum calculation upon the information of the plurality of rotated syndrome values to generate a flipping function value. The flipping circuit is coupled to the variable weighted-sum calculation circuit and is used for comparing the flipping function value with a flipping threshold value to generate a flipping result. The syndrome calculation check circuit determines whether to flip a specific bit of the plurality of bits according to the flipping result. When determining to flip the specific bit, the syndrome calculation check circuit calculates a syndrome value of the variable node $V_{i+1}$ based on the flipped specific bit. When determining not to flip the specific bit, the syndrome calculation check circuit uses the estimated syndrome value of the variable node $V_{i+1}$ generated by the first barrel shifter as the syndrome value of the variable node $V_{i+1}$.

According to an embodiment of the invention, a decoding method of a decoder device used in a flash memory controller is disclosed. The flash memory controller is used to be coupled between a host device and a flash memory. The decoding method comprises: using a syndrome calculation check circuit to calculate a syndrome value of a variable node $V_i$ of a parity check matrix according to a plurality of bits of a received input data, the parity check matrix including N×M sub-matrices formed by multiple variable nodes $V_1$–$V_N$ and multiple check nodes $C_1$–$C_M$, a value of i being in 1–N; using a first barrel shifter to rotate the syndrome value of the variable node $V_i$ into a vertical direction of a variable node $V_{i+1}$ to generate an estimated syndrome value of the variable node $V_{i+1}$; using a second barrel shifter to rotate a syndrome value of a variable node $V_{i-1}$ into a vertical direction of a variable node $V_{i+\Delta}$ to generate information of a rotated syndrome value; using a variable weighted-sum calculation circuit to determine a plurality of weight values based on information of a plurality of rotated syndrome values outputted by the second barrel shifter to perform a weighted-sum calculation upon the information of the plurality of rotated syndrome values to generate a flipping function value; comparing the flipping function value with a flipping threshold value to generate a flipping result; using the syndrome calculation check circuit to determine whether to flip a specific bit of the plurality of bits according to the flipping result; when determining to flip the specific bit, using the syndrome calculation check circuit to calculate a syndrome value of the variable node $V_{i+1}$ based on the flipped specific bit; and, when determining not to flip the specific bit, using the syndrome calculation check circuit to use the estimated syndrome value of the variable node $V_{i+1}$ generated by the first barrel shifter as the syndrome value of the variable node $V_{i+1}$.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
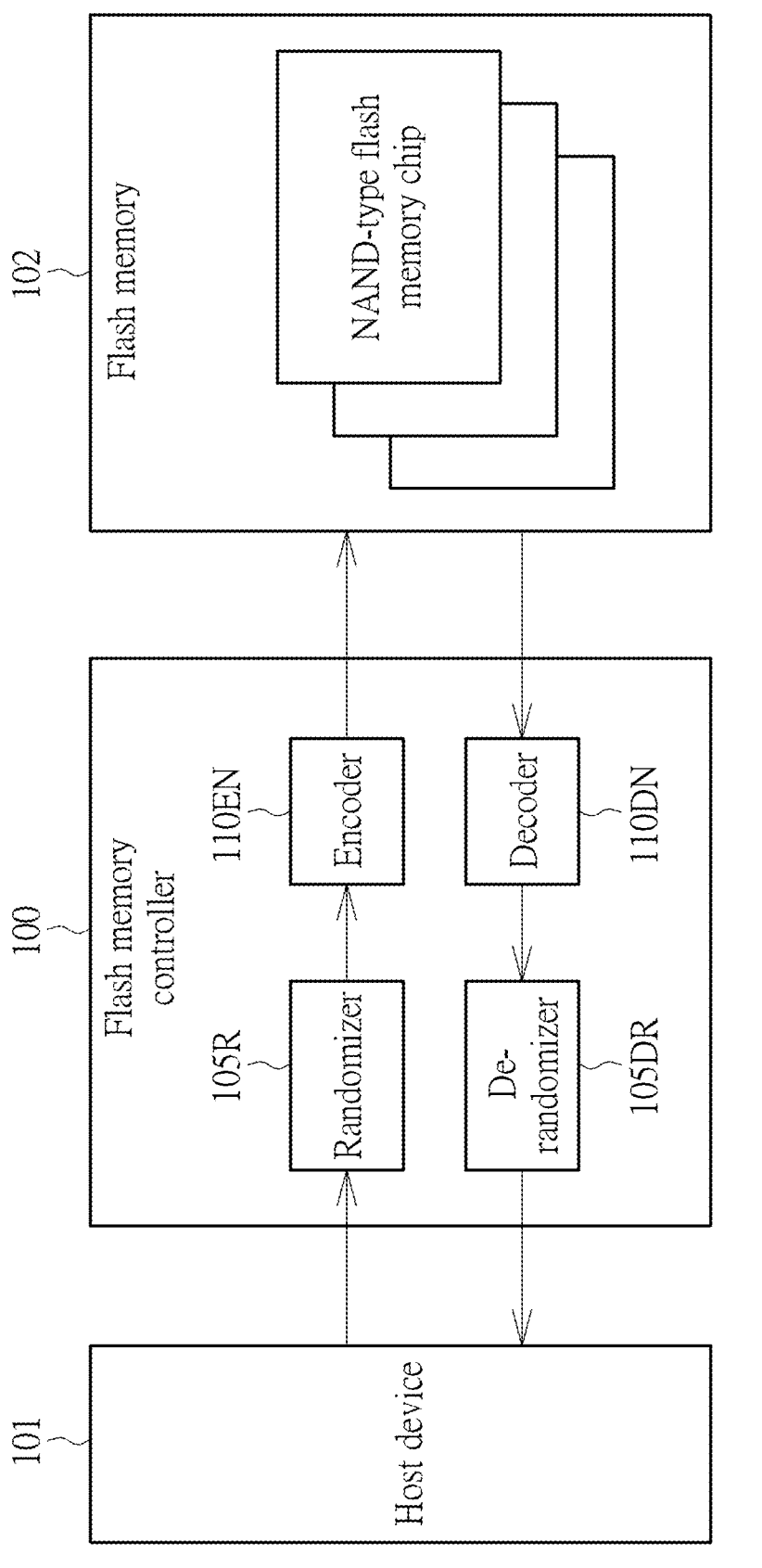
FIG. 1 is a block diagram of a flash memory controller according to an embodiment of the present invention.
Figure 2:
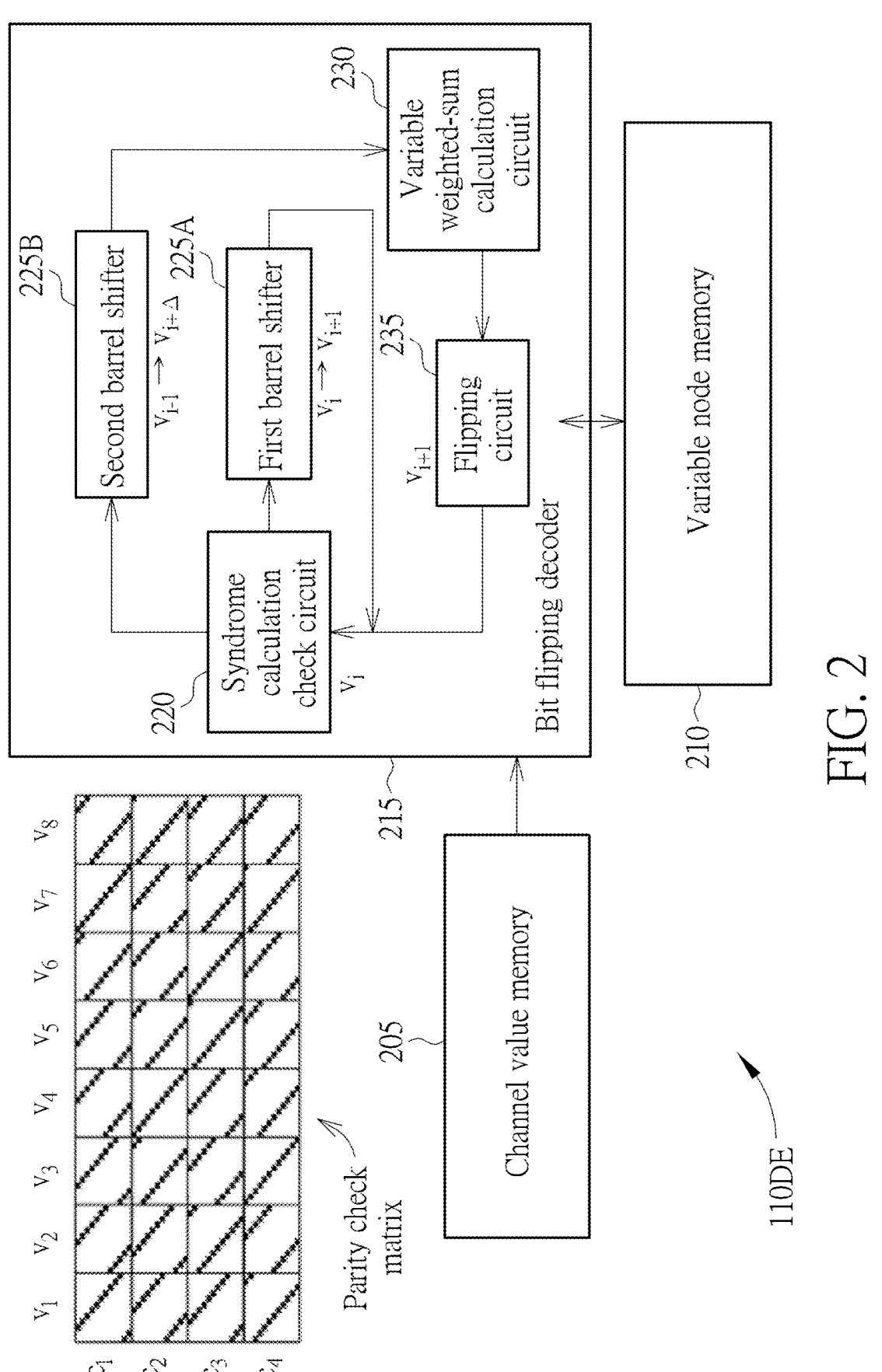
FIG. 2 is a circuit diagram of a bit flipping decoder device included in the flash memory controller shown in FIG. 1.

Refer to FIG. 1 in conjunction with FIG. 2. FIG. 1 is a block diagram of a flash memory controller 100 according to an embodiment of the present invention. FIG. 2 is a circuit diagram of a bit flipping decoder device included by the flash memory controller 100 as shown in FIG. 1. As shown in FIG. 1, the flash memory controller 100 is coupled between a host device 100 and a flash memory 102. The flash memory controller 100 includes a randomizer 105R, a de-randomizer 105DR, an encoder 110EN, and a decoder 110DE. The flash memory 102 includes a plurality of flash memory chips such as NAND-type flash memory chips. For example, when the host device 101 writes a data to one or more flash memory chips in the flash memory 102, the data to be written (for example simply called a write data) is first sent to the flash memory controller 100. The randomizer 105R performs a randomization operation upon the write data to generate a randomized write data to eliminate the data skew of the write data to reduce the occurrence of bit errors, and then the encoder 110EN performs an encoding processing operation (e.g. low-density parity check (LDPC) code operation) upon the randomized write data to generate an encoded write data, so as to write the encoded write data to one or more flash memory chips of the flash memory 102.

In addition, when the host device 101 reads a data from one or more flash memory chips in the flash memory 102, the data to be read (for example simply called a read data) is first sent to the flash memory controller 100, and the decoder 110DE performs a decoding processing operation (e.g. LDPC decoding processing, but not limited to) upon the read data to generate a decoded read data, to send the decoded read data to the de-randomizer 105DR, and then the de-randomizer 105DR performs a de-randomization processing operation upon the decoded read data to generate a de-randomized read data to send the de-randomized read data to host device 101.

It should be noted that operations of the randomizer 105R and the de-randomizer 105DR are a pair of operations, and in another embodiment the flash memory controller 100 may exclude the randomizer 105R and the de-randomizer 105DR; this example is also applicable to the present invention.

As shown in FIG. 2, the decoder 110DE is for example a bit flipping decoder device and includes a channel value memory 205, a variable node memory 210 and a bit flipping decoder 215. The bit flipping decoder 215 includes a syndrome calculation check unit/circuit 220, a first barrel shifter 225A, a second barrel shifter 225B, a variable weighted-sum calculation unit/circuit 230, and a flipping unit/circuit 235.

In one embodiment, the operations of both the first barrel shifter 225A and the second barrel shifter 225B are parallel to the operation of the flipping circuit 235. That is, the operations of the first barrel shifter 225A, operations of the second barrel shifter 225B, and the operations of the flipping circuit 235 can be performed separately at the same time, without waiting for any operation to be completed before the operations can be performed. Compared with the conventional flipping operation which cannot be performed until the barrel shifting operation is completed, the present invention can save a lot of time.

In addition, the operation of the bit flipping decoder device 110DE is the rotation in the all variable domain. The rotations of bit positions of the two barrel shifters 225A and 225B in response to the information of a parity check matrix in the invention are bit position conversions merely from the variable node domain into the same variable node domain and do not involve with the conversion from the variable node domain into the check node domain. Compared with the conventional barrel shift operation's conversion which is from the variable node domain into the check node domain and needs more complicated circuits for implementation, it is easier to implement the circuits of the two barrel shifters 225A and 225B of the present invention.

Specifically, the value of the read data, initially received by the decoder 110DE from the flash memory 102, is stored in the channel value memory 205. In this embodiment, the decoder 110DE is applied to the storage device, and thus the received read data value for example is the data read from one or more flash memories. If it is applied to a communication system, then the received read data for example is the data received by a mobile communication device such as a mobile phone. The channel value memory 205 can receive and store the value of the read data in the form of a codeword, and at this time the value of the received data is in the variable node domain.

The variable node memory 210 is used to store the value obtained by converting a syndrome value from a variable node domain into another variable node domain after calculating the syndrome value. For example, for performing the rotation operation from a column of the variable node domain into one column of the another variable node domain, when calculating the value generated by using the variable node $V_i$ in the i-th row to perform a rotation operation upon the syndrome value, it is needed to store the value generated by using the variable node $V_{i-1}$ in the (i-1)-th row to perform a rotation operation upon the syndrome value. The variable node memory 210 is used to store the values generated from the rotation operations performed upon the syndrome value by different variable nodes. Equivalently, the variable node memory 210 is used to store intermediate values generated during rotation operations.

Refer to FIG. 2 again. A parity check matrix as shown in FIG. 2 includes N×M (e.g. 32) sub-matrices formed by for example N variable nodes $V_1$–$V_N$ (N is for example 8) and M check nodes $C_1$ $C_M$ (M for example is 4). The black dots included in each sub-matrix represent for example the value of one while the values of other blank spaces that do not include black points are zero. For example, a sub-matrix corresponding to a check node $C_1$ in the vertical direction of the variable node $V_7$ is an identity matrix of order n, and n is for example 10 or 12 (but not limited) and corresponds to the number of bits of the received input data (but not limited). A sub-matrix as shown in FIG. 2 is a matrix of order 12; however, this is not intended to be a limitation of the invention. The values included in other sub-matrices are deduced in the same way, and are not described again for brevity.

The conversion/rotation operation of the present invention is an operation that converts/rotates a syndrome value from the domain of one variable node into the domain of another variable node to obtain the rotated value, and does not involve with the calculations of conversion/rotation from the domain of one variable node into the domain of a check node. Accordingly, this can reduce the design complexity and circuit costs of the barrel shifters. Specifically, the syndrome calculation check circuit 220 may at first sequentially perform the syndrome calculations for different variable nodes such as $V_{i-1}$ and $V_i$ according to the data values (i.e. the values of the read data such as 10 or 12 bits) stored in the channel value memory 205. The value of i is one of 1–N. For example, the syndrome calculation check circuit 220 performs the syndrome calculation for the variable node $V_6$. That is, the syndrome calculation check circuit 220 uses the sub-matrices of all check nodes corresponding to the vertical direction of the variable node $V_6$ sequentially upon the values of the read data to calculate a syndrome value. Then, the first barrel shifter 225A rotates the syndrome value calculated by the syndrome calculation check circuit 220 into the vertical direction of the next variable node $V_{i+1}$ to generate an estimated syndrome value of the variable node $V_{i+1}$. That is, the first barrel shifter 225A rotates the syndrome value of the variable node $V_6$ calculated by the syndrome calculation check circuit 220 into the vertical direction of the next variable node $V_7$.

In addition, the second barrel shifter 225B needs to be able to sequentially rotate the syndrome value of the variable node $V_{i-1}$ calculated by the syndrome calculation check circuit 220 into the vertical direction of the variable node $V_{i+\Delta}$ at most. The value of $\Delta$ can be designed for example as the number of maximum delay stages of the circuit units included in the bit flipping decoder 215. For example, in this embodiment, the number of delay stages of circuit units of the loop formed by the syndrome calculation check circuit 220 and the first barrel type 225A is equal to 2, and the number of delay stages of circuit units of the loop formed by the syndrome calculation check circuit 220, the second barrel shifter 225B, the variable weighted-sum calculation circuit 230 and the flipping circuit 235A is equal to 4. The value of $\Delta$ can be designed as 4. That is, in one embodiment, the second barrel shifter 225B at most can rotate the syndrome value of variable node $V_{i-1}$ calculated by the syndrome calculation check circuit 220 into the vertical direction of variable node $V_{i+4}$. If i is equal to 6 (but not limited to), then the second barrel shifter 225B can rotate the syndrome value of the variable node $V_5$ calculated by the syndrome calculation check circuit 220 into the vertical direction of the variable node $V_2$; in this situation, when the barrel shifter performs rotation, it will start from the first variable node $V_1$ if it reaches the last variable node $V_8$.

Then, the variable weighted-sum calculation circuit 230 performs a weighted-sum calculation upon the information of multiple rotated syndrome values (e.g. multiple previous syndrome values rotated into the direction of variable nodes) respectively corresponding to multiple previous bits stored in the variable node memory 210 according to the syndrome value (i.e. the syndrome value of variable node $V_{i-1}$ rotated into the direction of variable node $V_{i+4}$) rotated by the second barrel shifter 225B. For example, the variable weighted-sum calculation circuit 230 can determine multiple weighted values according to the information of the multiple rotated syndrome values respectively corresponding to the previous multiple bits to calculate the weighted-sum of the multiple rotated syndrome values to generate a flipping function value. Then, the flipping circuit 235 compares the flipping function value with a flipping threshold value to determine whether to flip a currently received bit, e.g. determining whether to flip a bit such as '1' as another bit '0' (but not limited) to generate a flipping result. The flipping threshold value can also be dynamically updated by the variable weighted-sum calculation circuit 230. The syndrome calculation check circuit 220 then corrects or does not correct a specific bit (e.g. the latest received bit) among the plurality of bits according to a flipping result (i.e. the result that the bit is flipped or not flipped) of the flipping circuit 235. For example, when determining to modify or correct the specific bit, the syndrome calculation check circuit 22 uses the corrected specific bit to re-calculate the syndrome value of the variable node $V_{i+1}$. Otherwise, the syndrome calculation check circuit 22 directly uses the estimated syndrome value of variable node $V_{i-1}$ rotated from the first barrel shifter 225A to obtain the syndrome value of variable node $V_{i+1}$. In one embodiment, when the syndrome value calculated by using the corrected specific bit is equal to 0, this indicates that the data of multiple bits has been correctly decoded, that is, the errors in the original multiple bits have been corrected to get the correct information.

Figure 3:
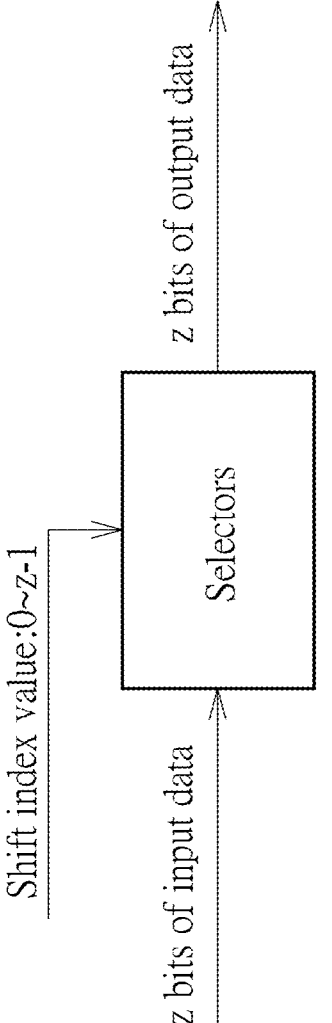
FIG. 3 is a schematic diagram of the comparison between the implementation of the second barrel shifter of the present invention and the barrel shifter of the prior art.
Figure 3:
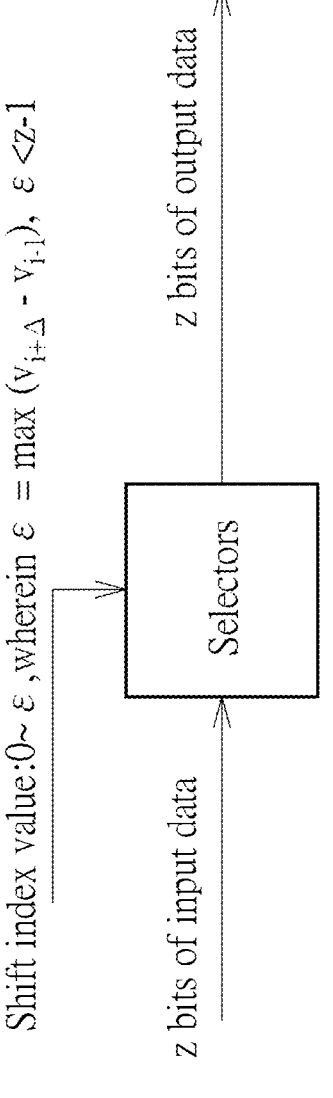

Compared with the conventional method, the conventional barrel shifters' rotation operations are to rotate from the domain of a variable node (i.e. a variable node domain) into the domain of a check node (i.e. a check node domain) and then rotate from the check node domain into the variable node domain. It is difficult to implement the conventional barrel shifters. Refer to FIG. 3. FIG. 3 is a schematic diagram showing the comparison between the implementation of the second barrel shifter 225B of the present invention and implementation of a conventional barrel shifter. As shown in the part (a) of FIG. 3, when the received input data is z bits, for implementation, it is needed to implement a range from 0 to $(z-1)$ as the range of the input shift index values for the selector circuit of the conventional barrel shifter. That is, the conventional barrel shifter needs to be able to support shifting $(z-1)$ bits at most. In addition, the conventional barrel shifter is to rotate from the domain of a variable node into the domain of a check node and then rotate from the domain of the check node back to the domain of the variable node. For example, as shown in the parity check matrix in FIG. 2, the rotation is to rotate from the direction of the variable node $V_6$ to the direction of the check node $C_1$ and then rotate from the direction of the check node $C_1$ back to the direction of variable node $V_6$, and the position arrangement of the black point data in the first sub-matrix of the variable node $V_6$ for example is in a sequential order of $\{8, 9, 0, 1, \ldots, 5, 6, 7\}$ if the order of the first sub-matrix is ten. In this example, the conventional barrel shifter needs to subtract 8 from the position information to shift the data of each black point in the first sub-matrix to the left by 8 bits, so as to rotate from the direction of the variable node $V_6$ to the direction of the check node $C_1$, and then needs to shift the data of each black point to the right by 8 bits to neutralize the rotation when it rotates from the direction of check node $C_1$ back to the direction of variable node $V_6$. Compared to the conventional method, in the embodiments, the first barrel shifter 225A only needs to shift the data of each back point of the above-mentioned first sub-matrix to the left by 8 bits if the rotation is to rotate from the direction of variable node $V_6$ into the direction of variable node $V_7$.

In addition, as shown in part (b) of FIG. 3, when the received input data is z bits, in the implementation, it is needed to implement a range from 0 to ε as the range of the input shift index values for the selector circuit of the second barrel shifter 225B. That is, the second barrel shifter 225B needs to be able to support shifting ε bits at most, wherein $\varepsilon=\max\{V_{i+\Delta}-V_{i-1}\}$. For example, $\Delta$ is equal to 4, and the second barrel shifter 225B needs to handle rotations from directions of different variable nodes $V_1$~$V_8$ into the directions of the corresponding variable nodes $V_1$~$V_8$. Therefore, according to the contents of the parity check matrix shown in FIG. 2, the second barrel shifter 225B only needs to be able to support shifting ε bits at most, but does not need to support shifting $(z-1)$ bits. That is, the value of ε can be smaller than the value of $z-1$. In this way, it is easier to implement the circuit design of the second barrel shifter 225B and reduce the circuit costs.

In summary, the two barrel shifters 225A and 225B of the present invention are located in two different calculation loops, so the rotation operations of the barrel shifters 225A and 225B can be performed simultaneously and in parallel. In addition, the operation loop in which the barrel shifter 225B of the present invention is located does not involve with the rotation operation between the domain of the variable node and the domain of the check node, and thus one circuit unit delay stage can be reduced compared to the conventional method. That is, compared to the conventional method, one processing time unit can be reduced, and the calculation can be performed more immediately than the conventional method, so the obtained syndrome value results can be more accurate.

Furthermore, other different sequences can also be applied into the parity check matrix of the embodiments of the present invention. For example, it can be implemented by using a Sidon sequence whose values are strictly increasing, or it can also be implemented by using a different sequence whose values are strictly decreasing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoder device used in a flash memory controller, the flash memory controller being used to be coupled between a host device and a flash memory, and the decoder device comprises:

a syndrome calculation check circuit, for calculating a syndrome value of a variable node $V_i$ of a parity check matrix according to a plurality of bits of a received input data, the parity check matrix including N×M sub-matrices formed by multiple variable nodes $V_1$–$V_N$ and multiple check nodes $C_1$–$C_M$, a value of i being in 1–N;

a first barrel shifter, coupled to the syndrome calculation check circuit, for rotating the syndrome value of the variable node $V_i$ into a vertical direction of a variable node $V_{i+1}$ to generate an estimated syndrome value of the variable node $V_{i+1}$;

a second barrel shifter, coupled to the syndrome calculation check circuit, for rotating a syndrome value of a variable node $V_{i-1}$ into a vertical direction of a variable node $V_{i+\Delta}$ to generate information of a rotated syndrome value;

a variable weighted-sum calculation circuit, coupled to the second barrel shifter, for determining a plurality of weight values based on information of a plurality of rotated syndrome values outputted by the second barrel shifter to perform a weighted-sum calculation upon the information of the plurality of rotated syndrome values to generate a flipping function value; and a flipping circuit, coupled to the variable weighted-sum calculation circuit, for comparing the flipping function value with a flipping threshold value to generate a flipping result;

wherein the syndrome calculation check circuit determines whether to flip a specific bit of the plurality of bits according to the flipping result; when determining to flip the specific bit, the syndrome calculation check circuit calculates a syndrome value of the variable node $V_{i+1}$ based on the flipped specific bit; and, when determining not to flip the specific bit, the syndrome calculation check circuit uses the estimated syndrome value of the variable node $V_{i+1}$ generated by the first barrel shifter as the syndrome value of the variable node $V_{i+1}$.

2. The decoder device of claim 1, wherein both the first barrel shifter and the second barrel shifter operate in a variable node domain, and neither the first barrel shifter nor the second barrel shifter performs a rotation operation from the variable node domain into a check node domain.

8

3. The decoder device of claim 1, wherein a value of Δ is equal to a number of maximum delay stages of circuit units included in the decoder device.

4. The decoder device of claim 3, wherein the value of Δ is equal to four.

5. The decoder device of claim 1, wherein the first barrel shifter and the second barrel shifter operate in parallel, and the first barrel shifter is located in a circuit loop which is different from a circuit loop in which the second barrel shifter is located.

6. A decoding method of a decoder device used in a flash memory controller, the flash memory controller being used to be coupled between a host device and a flash memory, and the decoding method comprises:

using a syndrome calculation check circuit to calculate a syndrome value of a variable node $V_i$ of a parity check matrix according to a plurality of bits of a received input data, the parity check matrix including N×M sub-matrices formed by multiple variable nodes $V_1$–$V_N$ and multiple check nodes $C_1$–$C_M$, a value of i being in 1–N;

using a first barrel shifter to rotate the syndrome value of the variable node $V_i$ into a vertical direction of a variable node $V_{i+1}$ to generate an estimated syndrome value of the variable node $V_{i+1}$;

using a second barrel shifter to rotate a syndrome value of a variable node $V_{i-1}$ into a vertical direction of a variable node $V_{i+\Delta}$ to generate information of a rotated syndrome value;

using a variable weighted-sum calculation circuit to determine a plurality of weight values based on information of a plurality of rotated syndrome values outputted by the second barrel shifter to perform a weighted-sum calculation upon the information of the plurality of rotated syndrome values to generate a flipping function value;

comparing the flipping function value with a flipping threshold value to generate a flipping result;

using the syndrome calculation check circuit to determine whether to flip a specific bit of the plurality of bits according to the flipping result;

when determining to flip the specific bit, using the syndrome calculation check circuit to calculate a syndrome value of the variable node $V_{i+1}$ based on the flipped specific bit; and when determining not to flip the specific bit, using the syndrome calculation check circuit to use the estimated syndrome value of the variable node $V_{i+1}$ generated by the first barrel shifter as the syndrome value of the variable node $V_{i+1}$.

7. The decoding method of claim 6, wherein both the first barrel shifter and the second barrel shifter operate in a variable node domain, and neither the first barrel shifter nor the second barrel shifter performs a rotation operation from the variable node domain into a check node domain.

8. The decoding method of claim 6, wherein a value of Δ is equal to a number of maximum delay stages of circuit units included in the decoder device.

9. The decoding method of claim 8, wherein the value of Δ is equal to four.

10. The decoding method of claim 6, wherein the first barrel shifter and the second barrel shifter operate in parallel, and the first barrel shifter is located in a circuit loop which is different from a circuit loop in which the second barrel shifter is located.

* * * * *